United States Patent
Johnston et al.

(10) Patent No.: US 9,034,972 B2
(45) Date of Patent: May 19, 2015

(54) BLEED RESISTANT, OIL-EXTENDED OLEFIN BLOCK COPOLYMER COMPOSITION WITH PRECIPITATED SILICA

(75) Inventors: Robert T. Johnston, Lake Jackson, TX (US); Ashish Batra, Carmel, IN (US); Raymond L. Laakso, Jr., St. Francisville, LA (US); Wenbin Liang, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/997,954

(22) PCT Filed: Dec. 14, 2011

(86) PCT No.: PCT/US2011/064874
§ 371 (c)(1),
(2), (4) Date: Jun. 25, 2013

(87) PCT Pub. No.: WO2012/091923
PCT Pub. Date: Jul. 5, 2012

(65) Prior Publication Data
US 2013/0274403 A1 Oct. 17, 2013

Related U.S. Application Data

(60) Provisional application No. 61/428,410, filed on Dec. 30, 2010.

(51) Int. Cl.
| | | |
|---|---|---|
| C08L 53/00 | (2006.01) | |
| C08K 3/36 | (2006.01) | |
| C08K 5/01 | (2006.01) | |
| C08K 5/103 | (2006.01) | |
| C08L 23/08 | (2006.01) | |

(52) U.S. Cl.
CPC . *C08L 53/00* (2013.01); *C08K 3/36* (2013.01); *C08K 5/01* (2013.01); *C08K 5/103* (2013.01); *C08L 23/0807* (2013.01); *C08L 2666/02* (2013.01)

(58) Field of Classification Search
USPC .................................................. 524/505, 579
See application file for complete search history.

(56) References Cited

U.S. PATENT DOCUMENTS

| | | |
|---|---|---|
| 4,810,395 A | 3/1989 | Levy et al. |
| 5,187,763 A | 2/1993 | Tu |
| 7,166,672 B2 | 1/2007 | Handlin, Jr. et al. |
| 7,501,468 B2 | 3/2009 | Stumphauzer et al. |
| 7,608,668 B2 | 10/2009 | Li Pi Shan et al. |
| 2005/0131112 A1 | 6/2005 | Henning et al. |
| 2006/0041049 A1* | 2/2006 | Sandstrom ............... 524/492 |
| 2007/0112127 A1* | 5/2007 | Soediono et al. ........ 524/543 |
| 2008/0249219 A1 | 10/2008 | Uehara et al. |

OTHER PUBLICATIONS

Dobrynin, J. Chem. Phys., 1997, 107(21), p. 9234-9238.
Potemkin, Physical Review E, 1998, 57(6), p. 6902-6912.

* cited by examiner

*Primary Examiner* — Robert D. Harlan
(74) *Attorney, Agent, or Firm* — Whyte Hirschboeck Dudek S.C.

(57) ABSTRACT

Disclosed are oil-extended olefin block copolymer compositions with precipitated silica. The precipitated silica reduces oil-bleed while maintaining composition softness.

10 Claims, 1 Drawing Sheet

20.1% gray scale
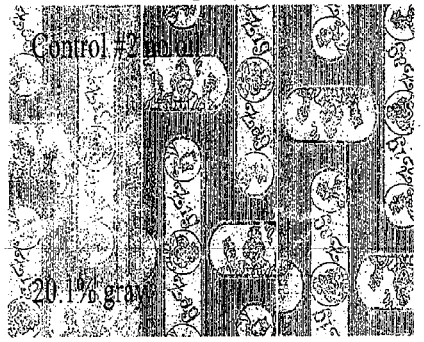
34.6% gray scale
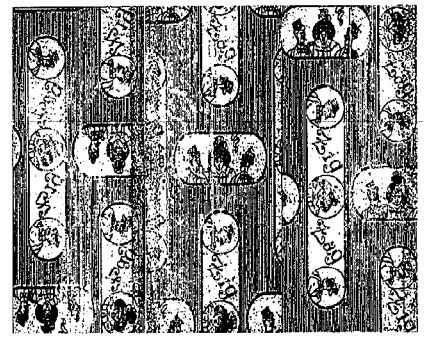
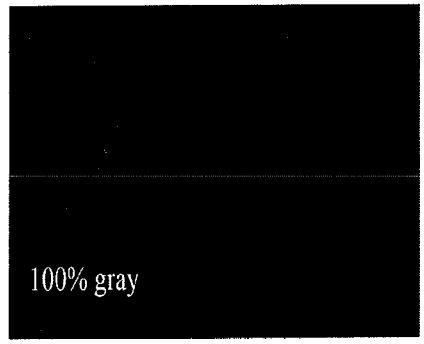
100% gray
51.6% gray scale

BLEED RESISTANT, OIL-EXTENDED OLEFIN BLOCK COPOLYMER COMPOSITION WITH PRECIPITATED SILICA

CROSS REFERENCE TO RELATED APPLICATION

The present application is the national phase of PCT Patent Application No. PCT/US2011/064874 filed Dec. 14, 2011, which claims priority to U.S. Provisional Application No. 61/428,410, filed Dec. 30, 2010, the entire content of which is incorporated by reference herein.

BACKGROUND

Olefin block copolymers (OBC) are useful for producing soft compounds such as soft touch articles. The block architecture of the OBC results in good tensile strength, compression set and temperature resistance. To make soft touch compositions (i.e., compositions with a low durometer value and/or a low Shore A hardness value), OBC is mixed with an oil. As the amount of oil is increased, so too increases the likelihood of oil-bleed. Oil-bleed is problematic because it produces undesirable haptics in articles fabricated from these compounds.

A need therefore exists for a soft, oil-extended OBC composition with reduced oil-bleed.

SUMMARY

The present disclosure is directed to oil-extended OBC compositions with reduced, or no, oil-bleed. The present compositions contain precipitated silica that is an oil-bleed inhibitor. The presence of the precipitated silica maintains the softness of the composition, and simultaneously reduces, or eliminates, oil-bleed.

The disclosure provides a composition. In an embodiment, an oil-extended olefin block copolymer composition is provided and includes an olefin block copolymer, an oil, and a precipitated silica.

The disclosure provides another composition. In an embodiment, an oil-extended olefin block copolymer composition is provided and includes an olefin block copolymer, from 100 phr to 250 phr of an oil, and from 30 phr to 100 phr of a precipitated silica. The composition has a Shore A hardness from 5 to 30 and a normalized oil-bleed index of less than 30 after three weeks at 23° C.

The disclosure provides another composition. In an embodiment, an oil-extended olefin block copolymer composition is provided and includes an olefin block copolymer, a propylene-based polymer, an oil, and a precipitated silica.

An advantage of the present disclosure is the provision of a soft oil-extended OBC composition with reduced, or no, oil-bleed.

An advantage of the present disclosure is the provision of an oil-extended OBC composition that is halogen-free.

BRIEF DESCRIPTION OF THE DRAWINGS

FIG. 1 shows examples of various grey scales used for the normalized oil-bleed index in accordance with an embodiment of the present disclosure.

DETAILED DESCRIPTION

The present disclosure provides an oil-extended olefin block copolymer (OBC) composition. An "oil-extended OBC composition," as used herein, is an OBC composition that contains an (i) OBC and (ii) at least 25 wt % oil, based on the total weight of the composition. In an embodiment, the oil-extended OBC composition contains at least 30 wt %, or at least 40 wt % to 70 wt %, or 60 wt %, or 50 wt % oil. In an embodiment, an oil-extended olefin block copolymer composition is provided and includes an olefin block copolymer, an oil, and a precipitated silica.

1. OBC

The term "olefin block copolymer" or "OBC" is an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. In some embodiments, the multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The olefin block copolymer includes various amounts of "hard" and "soft" segments. "Hard" segments are blocks of polymerized units in which ethylene is present in an amount greater than about 95 weight percent, or greater than about 98 weight percent based on the weight of the polymer. In other words, the comonomer content (content of monomers other than ethylene) in the hard segments is less than about 5 weight percent, or less than about 2 weight percent based on the weight of the polymer. In some embodiments, the hard segments include all, or substantially all, units derived from ethylene. "Soft" segments are blocks of polymerized units in which the comonomer content (content of monomers other than ethylene) is greater than about 5 weight percent, or greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can be present in an OBC from about 1 weight percent to about 99 weight percent of the total weight of the OBC, or from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in U.S. patent application Ser. No. 11/376,835, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetric (DSC) or equivalent technique.

The term "multi-block copolymer" or "segmented copolymer" is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), region-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a PDI from about 1.7 to about 3.5, or from about 1.8 to about 3, or from about 1.8 to about 2.5, or from about 1.8 to about 2.2. When produced in a batch or semi-batch process, the OBC possesses PDI from about 1.0 to about 3.5, or from about 1.3 to about 3, or from about 1.4 to about 2.5, or from about 1.4 to about 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The olefin block copolymer may also have:

(F) a molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3. It is understood that the olefin block copolymer may have one, some, all, or any combination of properties (A)-(G).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1, 3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the OBC has a density of less than or equal to about 0.90 g/cc, or less than about 0.89 g/cc. Such low density OBCs are generally characterized as amorphous, flexible and having good optical properties, e.g., high transmission of visible and UV-light and low haze.

In an embodiment, the olefin block copolymer has a density from about 0.85 g/cc to about 0.88 g/cc.

In an embodiment, the olefin block copolymer has a melt index (MI) from about 0.1 g/10 min to about 10 g/10, or from about 0.1 g/10 min to about 1.0 g/10 min, or from about 0.1 g/10 min to about 0.5 g/10 min as measured by ASTM D 1238 (190° C./2.16 kg).

The olefin block copolymer has a 2% secant modulus greater than zero and less than about 150, or less than about 140, or less than about 120, or less than about 100, MPa as measured by the procedure of ASTM D 882-02.

The present OBC has a melting point of less than about 125° C. The melting point is measured by the differential scanning calorimetry (DSC) method described in WO 2005/090427 (US2006/0199930), the entire content of which is incorporated by reference herein.

In an embodiment, the oil-extended OBC composition includes from about 20 wt % to about 60 wt % OBC, or from about 20 wt %, or about 30 wt % to about 60 wt %, or about 50 wt %, or about 40 wt %, or about 35 wt % OBC.

2. Oil

The oil-extended OBC composition includes an oil. The oil can be an aromatic oil, a mineral oil, a naphthenic oil, paraffinic oil, a triglyceride-based vegetable oil such as castor oil, a synthetic hydrocarbon oil such as polypropylene oil, a silicone oil, or any combination thereof. Nonlimiting examples of suitable oil include mineral oil sold under the tradenames HYDROBRITE® 550 (Sonnebom), Kaydol (Sonneborn), Britol 50T (Sonneborn), Clarion 200 (Citgo), and Clarion 500 (Citgo).

In an embodiment, the oil-extended OBC composition contains at least 25 wt %, or at least 30 wt %, or at least 40 wt %, or at least 45 wt % to 70 wt %, or 55 wt % oil. Weight percent is based on the total weight of the oil-extended OBC composition.

3. Precipitated Silica

The oil-extended OBC composition includes a precipitated silica. The term "precipitated silica," (or "p-silica") as used herein, is the reaction product of acidified sodium silicate followed by precipitation under alkaline conditions. A nonlimiting procedure for synthesizing precipitated silica includes initially acidifying a sodium silicate solution with an acid such as sulfuric acid. Under standard conditions, the sodium silicate solution and sulfuric acid are fed simultaneously in a stirred vessel containing water. Precipitation is carried out under alkaline conditions. The choice of agitation, duration of precipitation, the addition rate of reactants, their temperature and concentration, and pH can vary the properties of the silica. The formation of a gel stage is avoided by stirring at elevated temperatures.

In the next stage, the precipitated silica slurry is washed to remove soluble salts. Different filter types such as filter presses, rotary, or belt filters can be used. The resultant filter cake with typical solid content between 15-25% is then dried.

The most common drying techniques are spray drying and rotary drying, which give rise to different particle shapes, degrees of agglomeration, and to a lesser extent porosity. The dried silica may be subjected to milling and classifying steps to obtain a specific particle size distribution.

Precipitated silica is distinguishable from silica gels, quartz silica, and fumed silica. Precipitated silica is porous whereas silica gels, quartz silica, and fumed silica are non-porous. Precipitated silica typically has a broad meso/macroporous pore structure reflected in the pore size distribution, whereas other silicas generally have a more narrow microporous or mesoporous structure. Precipitated silica particles have an average diameter of 5-100 nm, a surface area of 5-100 m$^2$/g, and a density of 1.9-2.1 g/cm$^3$. Agglomerate size is 1-40 μm with an average pore size of greater than 30 nm.

Nonlimiting examples of suitable precipitated silica include Sipernat® 22, Sipernat® 33, Sipernat® 2200 (Degussa/Evonik) and Hi-Sil®ABS (PPG).

In contrast, the term "fumed silica" is a non-crystalline, fine-grain, low bulk density and high surface area silica. Fumed silica primary particle size is 5-50 nm. Fumed silica particles are non-porous and typically have a surface area of 50-600 m$^2$/g and a density of 2.2 g/cm$^3$. Fumed silica is made from flame pyrolysis of silicon tetrachloride or from quartz sand vaporized in a 3000° C. electric arc. The compacted volume of precipitated silica is lower than that of fumed silica since fumed silica consists of chain-shaped aggregates whereas precipitated silica consists of corpuscular, 3-dimensional aggregates.

In an embodiment, the oil-extended OBC composition contains from about 30 wt % to about 40 wt % olefin block copolymer, from about 45 wt % to about 55 wt % oil, and from about 10 wt % to about 30 wt % precipitated silica.

In an embodiment, the oil-extended OBC composition has a Shore A hardness from about 5, or about 10, or about 15, or about 20 to about 50, or 35, or 30, or 25.

The oil-extended OBC composition may or may not include an additional filler. In other words, the p-silica may or may not be the sole filler present in the composition. In an embodiment, the p-silica is the sole filler in the composition, the composition being void or otherwise devoid of another filler. Absence of an additional filler increases the softness of the oil-extended OBC composition. Nonlimiting examples of additional filler (present or absent in the composition) include talc, calcium carbonate, chalk, calcium sulfate, clay, kaolin, glass, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, and titanates.

In an embodiment, the oil-extended OBC composition is halogen-free.

In an embodiment, the oil-extended OBC composition is phthalate-free.

In an embodiment, the oil-extended OBC composition includes an oil/precipitated silica pre-mix. An "oil/precipitated silica pre-mix" (or "pre-mix") is a blend of any of the foregoing oils and any of the foregoing precipitated silicas that is prepared before being blended with the OBC. The pre-mix can be prepared by any suitable method that provides a homogeneous distribution of oil with precipitated silica, for example, by stirring oil into precipitated silica powder, stirring precipitated silica powder into oil, tumble-blending oil and precipitated silica together, or preferably spraying oil onto silica powder while mixing in a mill or mixer. Suitable mixers include paddle mixers, plowshare mixers, Henschel mixers and the like. Alternatively, a non-homogenous mixture can be prepared provided that the mixture is subsequently well-mixed with polymer. Other methods for preparing pre-mixes include methods involving little or no agitation such as placing both oil and precipitated silica in a container and providing time and optionally thermal exposure so that oil is sorted into the precipitated silica. Nonlimiting examples of suitable oil/p-silica pre-mix include Polydex HS(Britol) 70 and Polydex HS(550) 70, available from Polychem Dispersions, Inc.

In an embodiment, the pre-mix contains 60-80 wt % oil and 40-20 wt % p-silica, based on total weight of the premix. In a further embodiment, the pre-mix contains 70 wt % oil and 30 wt % p-silica.

Applicants have surprisingly discovered that provision of a precipitated silica unexpectedly reduces oil-bleed while maintaining softness in oil-extended OBC compositions. The term "oil-bleed-out" or "oil-bleed" is the phenomenon whereby oil migrates from the interior of a polymeric component to the surface of the polymeric component. Oil-bleed makes the surface sticky and/or slippery. Oil-bleed typically results in adverse "feel" (haptics) and/or adverse "optics" (visual appearance). The term "oil exudation" is the process of oil moving from an interior location to a surface of a polymeric component. Oil exudation yields oil-bleed. In other words, oil-bleed is the end result of oil exudation. Oil-bleed is accelerated by elevated temperatures.

Oil-bleed is evaluated by way of a normalized oil-bleed index (NOBI). NOBI is an optical measurement of the amount of oil absorbed on cigarette paper from an oil-containing polymeric composition. NOBI is calculated according to the following equation:

$$\text{Normalized Oil-bleed Index} = 100 \cdot (\% \text{ grey scale sample} - \% \text{ grey scale control})/(100 - \% \text{ grey scale control})$$

The term "% grey scale sample" is the percent grey scale measured on the aged sample and "% grey scale control" is a measurement on an imaged untreated sheet of cigarette paper. The term "% grey scale" is equal to the percentage of black pixels on a binary (black and white) digital image of the cigarette paper. The image can be obtained for example by digital scanning or digitally photographing a sheet of cigarette paper. NOBI has a range from 0-100. When NOBI=100, the paper is saturated and the test does not register oil-bleed beyond that level. When NOBI=0, the paper has no oil markings and its appearance is similar to that of untreated cigarette paper. Normal experimental error may result in a higher value of NOBI for a control sample (untreated sheet of cigarette paper) than for a treated sample with low oil absorption, thus creating negative values of NOBI.

FIG. 1 shows four degrees of grey scale with conversion to a corresponding NOBI index (using the NOBI equation above) as set forth in Table 1 below.

TABLE 1

| % Grey Scale (FIG. 1) | NOBI Index |
| --- | --- |
| 20.1% | 0 |
| 34.6% | 18.1 |
| 51.6% | 46.0 |
| 100% | 100 |

In an embodiment, the oil-extended OBC composition has a NOBI index of less than 30, or from 0, or 1, or 2, or 5 to less than 30, or less than 20, or less than 15, or less than 10 after 24 hours at 23° C.

In an embodiment, the oil-extended OBC composition has a NOBI index of less than 30, or from 0, or 1, or 2, or 5 to less than 30, or less than 20, or less than 15, or less than 10 after 1 week at 23° C.

In an embodiment, the oil-extended OBC composition has a NOBI index of less than 30, or from 1, or 2, or 5 to less than 30, or less than 20, or less than 15, or less than 10 after 3 weeks at 23° C.

In an embodiment, the oil-extended OBC composition has a Shore A hardness from 5, or 10 to 50, or 30, or 25, or 20.

Applicants have surprisingly discovered that provision of the precipitated silica unexpectedly reduces oil-bleed while maintaining softness in oil-extended OBC compositions. Bounded by no particular theory, it is believed that the surface of the porous lattice of the precipitated silica sorbs and holds the oil. In this way, provision of the precipitated silica inhibits or otherwise avoids the phenomenon of oil partition that occurs between (i) the oil and (ii) the OBC hard segments and the soft segments as is evident in compositions containing only oil and OBC. Rather, the precipitated silica crystallites form stable structures with the oil in the present composition, thereby advantageously preventing oil exudation. In addition, the flexibility and the small crystalline size of the precipitated silica contribute to the clarity, flexibility and softness of the present composition.

The disclosure provides another composition. In an embodiment, an oil-extended polymeric composition is provided and includes an olefin block copolymer, from 100 phr to 250 phr oil, and from 30 phr to 100 phr precipitated silica. The composition has a Shore A hardness from 5 to 30. The composition also has a normalized oil-bleed index of less than or equal to 30 after three weeks at 23° C.

The term "phr" or "parts per hundred," as used herein, is based on a composition having 100 phr OBC. In other words, the composition contains 100 phr OBC. The term "phr" provides a way to identify the unique relationship between the OBC, the oil, and the precipitated silica regardless of other optional components that may be present in the composition.

In an embodiment, the oil-extended OBC composition includes 150 phr oil.

In an embodiment, the oil-extended OBC composition includes 214 phr oil.

In an embodiment, the oil-extended OBC composition contains from 60 phr to 100 phr precipitated silica.

In an embodiment, the oil-extended OBC composition has a NOBI index of less than 30, or from 0, or 1, or 2, or 5 to less than 30, or less than 20, or less than 15, or less than 10 after 24 hours at 23° C.

In an embodiment, the oil-extended OBC composition has a NOBI index of less than 30, or from 1, or 2, or 5 to less than 30, or less than 20, or less than 15, or less than 10 after 1 week at 23° C.

In an embodiment, the oil-extended OBC composition has a NOBI index of less than 30, or from 1, or 2, or 5, to less than 30, or less than 20, less than 15, or less than 10 after 3 weeks at 23° C.

In an embodiment, the oil-extended OBC composition has a Shore A hardness from 5, or 10 to 50, or 40, or 30, or 25, or 20.

The disclosure provides another composition. In an embodiment, an oil-extended olefin block copolymer composition is provided and includes an olefin block copolymer, an olefin-based polymer, an oil, and precipitated silica. The olefin-based polymer may be an ethylene-based polymer or a propylene-based polymer. In a further embodiment, the olefin-based polymer is a propylene-based polymer such as a propylene homopolymer or a propylene copolymer.

In an embodiment, the propylene-based polymer is a propylene homopolymer.

In an embodiment, the oil-extended OBC composition contains 10 wt % to 40 wt % OBC, 5 wt % to 20 wt % propylene homopolymer, 20 wt % to 60 wt % oil, and 5 wt % to 25 wt % p-silica. Weight percent is based on total weight of the oil-extended composition.

In an embodiment, the oil-extended OBC composition has a NOBI index of less than 30, or from 0, or 1, or 2, or 5 to less than 30, or less than 20, or less than 15, or less than 10 after 24 hours at 23° C.

In an embodiment, the oil-extended OBC composition has a NOBI index of less than 30, or from 1, or 2, or 5 to less than 30, or less than 20, or less than 15, or less than 10 after 1 week at 23° C.

In an embodiment, the oil-extended OBC composition has a NOBI index of less than 30 or from 1, or 2, or 5 to less than 30, or less than 20, or less than 15, or less than 10 after 3 weeks at 23° C.

Any of the foregoing oil-extended olefin block copolymer compositions may optionally include one or more of the following additives: slip agents, anti-blocking agents, plasticizers oils, antioxidants, UV stabilizers, colorants or pigments, fillers, lubricants, antifogging agents, flow aids, coupling agents, cross-linking agents, nucleating agents, surfactants, solvents, flame retardants, antistatic agents, and any combination thereof. The total amount of the additive(s) can range from about greater than 0, or about 0.001%, or about 0.01%, or about 0.1%, or about 1%, or about 10% to about 80%, or about 70%, or about 60%, or about 50%, or about 40% of the total weight of the polymer blend.

Any of the foregoing oil-extended olefin block copolymer compositions may comprise two or more embodiments disclosed herein.

Any of the foregoing oil-extended olefin block copolymer compositions may be a component of one or more of the following articles: molded articles, extruded articles, overmolded grips, baby bibs, gaskets. The oil-extended OBC compositions disclosed herein can be used to manufacture durable articles for the automotive, construction, medical, food and beverage, electrical, appliance, business machine, and consumer markets. In some embodiments, the oil-extended OBC composition is used to manufacture flexible durable parts or articles selected from toys, grips, soft touch handles, bumper rub strips, floorings, auto floor mats, wheels; casters, furniture and appliance feet, tags, seals, gaskets such as static and dynamic gaskets, automotive doors, bumper fascia, grill components, rocker panels, hoses, linings, office supplies, seals, liners, diaphragms, tubes, lids, stoppers, plunger tips, delivery systems, kitchen wares, footwear, shoe bladders and shoe soles. In other embodiments, the oil-extended OBC composition can be used to manufacture durable parts or articles that require a high tensile strength and low compression set. In further embodiments, the oil-extended OBC composition can be used to manufacture durable parts or articles that require a high upper service temperature and low modulus.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range.

The terms "blend" or "polymer blend," as used herein, is a blend of two or more components (or two or more polymers). Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises a majority weight percent polymerized ethylene monomer (based on the total weight of polymerizable monomers), and optionally may comprise at least one polymerized comonomer.

Normalized oil-bleed index (NOBI) is an optical measurement of the amount of oil absorbed on cigarette paper from an oil-containing polymer composition. NOBI is a phenomenological measurement related not only to the rate of oil migration to the surface but also the rate of oil absorption by the paper and the translucence induced thereby. NOBI is not directly proportional to the mass of the oil on the surface.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term, "propylene-based polymer," as used herein, refers to a polymer that comprises a majority weight percent polymerized propylene monomer (based on the total amount of polymerizable monomers), and optionally may comprise at least one polymerized comonomer.

Test Methods $^{13}$C NMR is performed on OBC polymer to determine weight percent hard segment/soft segment.

A. $^{13}$C NMR Sample Preparation

The sample is prepared by adding approximately 2.7 g of stock solvent to 0.21 g sample in a 10 mm NMR tube, and then purging in a $N_2$ box for 2 hours. The stock solvent is made by dissolving 4 g of PDCB in 39.2 g of ODCB with 0.025M chromium acetylacetonate (relaxation agent). The sample is dissolved and homogenized by heating the tube and its contents at 140-150° C.

B. Data Acquisition Parameters

The data are collected using a Bruker 400 MHz spectrometer equipped with a Bruker Dual DUL high-temperature CryoProbe. The data are acquired using 320 transients per data file, a 7.3 sec pulse repetition delay (6 sec delay+1.3 sec acq. time), 90 degree flip angles, and inverse gated decoupling with a sample temperature of 120° C. All measurements are made on non-spinning samples in locked mode. Samples are homogenized immediately prior to insertion into the heated (125° C.) NMR Sample changer, and are allowed to thermally equilibrate in the probe for 15 minutes prior to data acquisition.

Differential scanning calorimetry (DSC) is performed on compression molded specimens using a TA Instruments Q100 or Q1000 DSC and a crimp-sealed Perkin Elmer pan. Samples are equilibrated at −90° C. for 5 min., then heated at 10° C./min. to 180° C. (capturing the "1$^{st}$ Heat DSC Curve"), held for 5 min., then cooled at 10° C./min. to −90° C. (capturing the "crystallization curve"), held for 5 minutes, then heated at 10° C./min. to 180° C. (capturing the "2$^{nd}$ Heat DSC Curve"). The data is analyzed using TA Universal Analysis software after run completion.

Melt Index (MI) is measured in accordance with ASTM D 1238, Condition 190° C./2.16 kg.

Normalized oil-bleed index (NOBI) is an optical measurement to compare oil-bleed characteristics. Optical measurements are obtained according to the following procedure.

1. Test specimens in the form of approximately 3×6⅛× 0.125 inch specimens are cut from the compression molded plaques. Specimens are cut from areas with minimal bubbles/dimples.
2. Within 2 hours of compression molding, the specimens are overlaid with 3 pieces of ZigZag cigarette paper laid side-to-side, with the length direction of the paper aligned perpendicular to the length direction of the specimens. A sheet of Mylar film is placed on the other side of the paper, so that a sandwich is formed of Mylar film-paper-plaque.
3. The sandwich is placed in 40 or 60° C. ovens or at room temperature in the laboratory, Mylar film layer down. Samples are then aged for 24 hours, 1 week, and 2 weeks or 3 weeks. No mass is present on top of the sample plaques, i.e., the force on the paper is due to the mass of the plaque and gravity. The samples are either supported by a laboratory countertop, the base of the oven chamber, or a metal wire rack in the Thermo oven. No additional support surface is present on the wire racks so the force is concentrated on the wires of the rack, though the Mylar sheet distributes it somewhat. The wires are approximately ⅛ inch diameter and are spaced ¾ inch apart (center to center).
4. Following aging, one of the three papers is removed from the specimen and the specimen is returned to the oven until the third paper is removed at the end of the aging period. Paper removal is difficult in the case of samples with considerable oil bleed since the paper is prone to tearing; if necessary, the torn paper is pieced together as well as possible. The removed paper from a given specimen is adhered (using double-sided tape) to a standard approx. 9×12 inch sheet made from non-glossy black compound.
5. Papers are scanned and analyzed as described below. First a control sample is scanned (a new sheet of cigarette paper that is not attached to a plaque). Then, a paper sample from a plaque sandwich is removed from the sandwich, mounted on the black plaque as described above, and scanned. This is repeated for the other samples. All samples are scanned as quickly as possible, one after another, to minimize potential for scanner drift. Note that the same black plaque is used for all samples, so the mounting and analysis is done sequentially.
6. Scanning is performed using a Xerox WorkCentre M118i copier/fax/scanner. The image is scanned in "Text" mode at 200 dpi, and saved as a TIFF file.
7. Method A. The TIFF file is opened in Microsoft Paint, cropped on two sides, then saved. The image is then opened in Adobe Photoshop CS2 (v.9) and cropped on the other two sides. The "text mode" image is a bitonal image. The percentage of black pixels in the image was the desired result. This is conveniently obtained in this software by first converting it to an 8-bit greyscale image so that a greyscale histogram can be created, with just 2 levels of greyscale, 0 (black) to 255 (white). The percentile of the 0 greyscale level in the histogram is the same as the percentage of black pixels. (This value was called "% grey scale" but is actually a percentile and for the method as described is equal to the "% black pixels" in the bitonal image. The method works because Photoshop CS2 compresses large images by combining 4 pixels into 1 greyscale pixel when using Cache Level 2 thus creating 5 grey scale colors ranging from all white to all black; the grey scale percentile in the histogram is thus equivalent to the percent black pixels in the bitonal image).

Method B. As an alternative to and more direct method than Method A, a bitonal image is opened with ImageJ software (v. 1.41) (National Institutes of Health) and the region of cigarette paper selected using the select tool. Using the Analyze\ Set Measurement menu, "Area Fraction" is selected as a desired output. Then, using the Analyze\Measure menu, the % Area is reported for the selected image area. This % Area is the % black pixels in the selected area.

8. This "% grey scale" (equal to % black pixels) is recorded along with the images in an Excel spreadsheet for both the control sheet as well as the paper sheets in contact with a polymer specimen.

Molded plaques are aged for 24 hrs, 1 week and 2 weeks or 3 weeks (at 23° C. and 60° C.) while resting on sheets of ZigZag cigarette paper. After aging, the cigarette paper is removed and optically scanned against a black background to measure the extent of oil-bleed. A normalized oil-bleed index (NOBI) is calculated according to the following equation:

Normalized Oil-bleed Index=100·(% grey scale sample−% grey scale control)/(100−% grey scale control)

The term "% grey scale sample" is the percentile grey scale (% black pixels) measured on the aged sample and "% grey scale control" is a measurement on an unaged untreated sheet of cigarette paper. NOBI has a range from 0 to 100. When NOBI=100, the paper is saturated and the test does not register oil-bleed beyond that level. FIG. 1 shows four examples of grey scale: 20.1%, 34.6%, 51.6%, and 100% grey scale. If the first example (20:1%) is used as the control for normalization, then corresponding NOBI values for these four images are 0%, 18.1%, 46.0% and 100%.

Shore A hardness is measured on molded plaques in accordance with ASTM D 2240. This test method permits hardness measurements based on either initial indentation or indentation after a specified period of time, or both. In the examples, a specified time of 10 seconds is used.

By way of example and not by limitation, examples of the present disclosure will now be provided.

EXAMPLES

Example 1 p-Silica Compared to Other Silicas

The properties of the materials used in Example 1 are provided in Table 2 below.

TABLE 2

| Ingredient | Component | Specifications | Source |
|---|---|---|---|
| D9007 | OBC-ethylene/octene block copolymer | 0.5 MI, 0.865 g/cc density 11 wt %/89 wt % hard/soft segment split and 18 mol % (46.75 wt %) octene in the soft segment, and 15.6 mol % (42.5 wt %) total octene. | The Dow Chemical Company |
| Hydrobrite 550 | Oil | mineral oil with nominal 70% paraffinic and 30% naphthenic content, and average 541 MW | Sonneborn |
| Sip 22 | Precipitated Silica | BET surface area 190.0 m$^2$/g; density 2.0 g/cc; ave. primary particle size 18.0 nm; ave. particle size 7 μm, compacted apparent density 120.0 g/l; DBP absorption 270.0 g/100 g; specific gravity 2.0 | Degussa/Evonik |
| Fumed | Fumed Silica | Powder, 0.007 μm, CAS 112945-52-5, MW 60.08; surface area 350.0-410.0 m$^2$/g; pH 3.7-4.3 (4% aq. slurry); less than 0.02% mesh residue (325 mesh residue) | Aldrich Chemical Company |
| Quartz | Quartz Silica | Silicon dioxide -325 mesh, CAS 60676-86-0, MW 60.08 | Aldrich Chemical Company |

Samples are prepared as follows:

Except for examples where an oil/silica premix is used, oil is imbibed into OBC polymer at 50-60° C. overnight, at a minimum.

Compounding is accomplished using a HAAKE torque rheometer with a 190° C. Rheomix 3000E mixing bowl and roller blades at nominal mixing speed of 60 rpm for a period of 5-6 minutes after all of the formulation components were added to the mixing bowl.

Compression molding is done at 190° C. using an approximately 125 mil thick chase, using the following program:
2 minutes at 3000 psi
2 minutes at 5000 psi
5 minutes at 40,000 psi
Cool for 5 minutes at 40,000 psi Samples are tested for hardness and oil bleed as previously described.

Molded plaques are aged (24 hrs, 1 week and 3 weeks at 23° C. and 60° C.) while resting on sheets of ZigZag cigarette paper. After aging, the cigarette paper is removed and optically scanned against a black background to measure the extent of oil-bleed. The normalized oil-bleed index (NOBI) is calculated.

The hardness of each sample is measured. The results are shown in Tables 3A-3D below.

TABLES 3A-3D

| 3A phr Ingredient | 1 Cntl | 2 Sip 22 | 3 Fumed | 4 Quartz |
|---|---|---|---|---|
| D9007 | 100 | 100 | 100 | 100 |
| Hydrobrite 550 | 150 | 150 | 150 | 150 |
| Sipernat 22 (Degussa/Evonik) | | 64 | | |

TABLES 3A-3D-continued

| | | | | |
|---|---|---|---|---|
| Fumed silica (Aldrich) | | | 64 | |
| Silica quartz (Aldrich) | | | | 64 |
| TOTAL | 250 | 314 | 314 | 314 |

| 3B Wt (% based on total Wt composition) Ingredient | 1 Cntl | 2 Sip 22 | 3 Fumed | 4 Quartz |
|---|---|---|---|---|
| D9007 | 40% | 32% | 32% | 32% |
| Hydrobrite 550 | 60% | 48% | 48% | 48% |
| Sipernat 22 (Degussa/Evonik) | 0% | 20% | 0% | 0% |
| Fumed silica (Aldrich) | 0% | 0% | 20% | 0% |
| Silica quartz (Aldrich) | 0% | 0% | 0% | 20% |
| TOTAL | 100% | 100% | 100% | 100% |

| 3C Wt (g) Ingredient | 1 Cntl | 2 Sip 22 | 3 Fumed | 4 Quartz |
|---|---|---|---|---|
| D9007 | 76.0 | 60.5 | 63.7 | 60.5 |
| Hydrobrite 550 | 114.0 | 90.8 | 95.5 | 90.8 |
| Sipernat 22 (Degussa/Evonik) | 0.0 | 38.7 | 0.0 | 0.0 |
| Fumed silica (Aldrich) | 0.0 | 0.0 | 40.8 | 0.0 |
| Silica quartz (Aldrich) | 0.0 | 0.0 | 0.0 | 38.7 |
| TOTAL | 190.0 | 190.0 | 200.0 | 190.0 |

| 3D Normalized Oil Bleed Index (NOBI) results | 1 | 2 | 3 | 4 |
|---|---|---|---|---|
| 24 hrs @ 23° C. | 41 | 4 | 5 | 51 |
| 24 hrs @ 60° C. | 88 | 12 | 13 | 95 |
| 1 week @ 23° C. | 71 | 17 | −1 | 68 |
| 1 week @ 60° C. | 99 | 28 | 12 | 98 |
| 3 week @ 23° C. | 93 | 29 | 9 | 95 |
| 3 week @ 60° C. | 100 | 59 | 9 | 100 |
| Shore A Hardness (10 sec.), average of 5 readings | 5 | 29 | 30 | 9 |

Example 1 Results

Applicants unexpectedly discovered that precipitated silica provides the same or better oil-bleed resistance (i.e., low NOBI index, particularly at 23° C.) with minimal increase in Shore A hardness when compared to oil-extended OBC compositions with fumed silica and/or quartz silica.

Known is the difficulty of handling fumed silica due to its fineness, thinness and ease to become airborne. Fumed silica also poses a health risk as it is readily inhaled. Precipitated silica is advantageous over fumed silica as it avoids the foregoing handling difficulties and health risk associated with fumed silica yet precipitated silica provides the same or better bleed-resistant properties when applied to oil-extended OBC composition. Provision of precipitated silica further yields acceptable softness for the oil-extended OBC composition.

Compared to quartz silica, precipitated silica provides better oil-bleed resistance as shown in the Tables 3A-3D.

Example 2

Effect of p-Silica Concentration

The properties of the materials used in Example 2 are provided below.

D9007—same as Example 1.

C11R07 (The Dow Chemical Company)—ethylene/octene block copolymer—0.48 MI, 0.877 g/cc density OBC, 148 ppm Zn, 15/85 hard/soft segment split, 12.6 mol % octene in the soft segment, and 10.56 mol % total octene.

Hydrobrite 550 (Sonnebom)—same as Example 1.

Kaydol (Sonnebom)—white mineral oil with nominal 57% paraffinic carbon and 43% naphthenic carbon, and 430 MW.

Clarion 200 (Citgo)—white mineral oil. Nominal viscosity (SUS@100° F.) is 193.

Clarion 500 (Citgo)—white mineral oil. Nominal viscosity (SUS@100° F.) is 562.

Britol 50T (Sonnebo™)—white mineral oil.

Polydex HS(Britol)70 (Polychem Dispersions, Inc.)—70% Britol 50T oil on a precipitated silica carrier (HiSil ABS).

Sample Preparation

Compounds are prepared in a 190° C. Haake Rheomix 3000E mixer with roller style blades following the general procedure provided in Example 1. Preimbibing OBC pellets with oil minimized slippage and mixing time.

Molded plaques are aged (24 hrs, 1 week and 3 weeks at 23° C. and 60° C.) while resting on sheets of ZigZag cigarette paper. After aging, the cigarette paper is removed and optically scanned against a black background to measure the extent of oil-bleed. The normalized oil-bleed index (NOBI) is calculated.

The hardness of each sample is measured. The results are shown in Tables 4A-4D below.

TABLES 4A-4D

| Ingredients | 1 | 2 | 3 | 4 | 5 | 6 | 7 | 8 | 9 | 10 | 11 | 12 |
|---|---|---|---|---|---|---|---|---|---|---|---|---|
| | | Effect of Oil Type | | | | Silica Level Optimization | | | | Oil Level Increase | | |
| | | | | | | 4A phr | | | | | | |
| D9007 | 100 | 100 | 100 | 100 | | 100 | 100 | 100 | 100 | 100 | 100 | 100 |
| C11R07 | | | | | 100 | | | | | | | |
| Hydrobrite 550 | 150 | | | | 150 | | 50.6 | 100.3 | 233 | | 77.6 | 155.3 |
| Clarion 200 | | 150 | | | | | | | | | | |
| Clarion 500 | | | 150 | | | | | | | | | |
| Kaydol | | | | 150 | | | | | | | | |
| HS(Britol) 70 [70% oil/30% p-silica] | | | | | | 214 | 142 | 71 | | 333 | 222 | 111 |
| TOTAL | 250 | 250 | 250 | 250 | 250 | 314 | 292.6 | 271.3 | 333 | 433 | 399.6 | 366.3 |
| | | | | | | 4B Wt (% based on total Wt composition) | | | | | | |
| D9007 | 40 | 40 | 40 | 40 | | 32 | 34 | 37 | 30 | 23 | 25 | 27 |
| C11R07 | | | | | 40 | | | | | | | |
| Hydrobrite 550 | 60 | | | | 60 | | 17 | 37 | 70 | | 19 | 42 |
| Clarion 200 | | 60 | | | | | | | | | | |
| Clarion 500 | | | 60 | | | | | | | | | |
| Kaydol | | | | 60 | | | | | | | | |
| HS(Britol) 70 [70% oil/30% p-silica] | | | | | | 68 | 49 | 26 | | 77 | 56 | 30 |
| TOTAL | 100% | 100% | 100% | 100% | 100% | 100% | 100% | 100% | 100% | 100% | 100% | 100% |
| | | | | | | 4C Wt (g) | | | | | | |
| D9007 | 76.00 | 76.00 | 76.00 | 76.00 | | 60.51 | 64.94 | 70.03 | 57.06 | 46.19 | 50.05 | 54.60 |
| C11R07 | | | | | 76.00 | | | | | | | |
| Hydrobrite 550 | 114.00 | | | | 114.00 | | 32.86 | 70.24 | 132.94 | | 38.84 | 84.79 |
| Clarion 200 | | 114.00 | | | | | | | | | | |
| Clarion 500 | | | 114.00 | | | | | | | | | |
| Kaydol | | | | 114.00 | | | | | | | | |
| HS(Britol) 70 [70% oil/30% p-silica] | | | | | | 129.49 | 92.21 | 49.72 | | 153.81 | 111.11 | 60.61 |
| TOTAL | 190.00 | 190.00 | 190.00 | 190.00 | 190.00 | 190.00 | 190.00 | 190.00 | 190.00 | 200.00 | 200.00 | 200.00 |
| | | | | | | 4D Normalized Oil Bleed Index (NOBI) results | | | | | | |
| 24 hrs @ 23° C. | 42 | 48 | 41 | 39 | 13 | 3 | 9 | 33 | 78 | 25 | 53 | 74 |
| 24 hrs @ 60° C. | 83 | 95 | 87 | 88 | 11 | 13 | 31 | 82 | 99 | 41 | 84 | 99 |
| 1 week @ 23° C. | 70 | 81 | 66 | 64 | 19 | 0 | 23 | 65 | 97 | 29 | 85 | 96 |
| 1 week @ 60° C. | 96 | 100 | 100 | 99 | 38 | 15 | 80 | 90 | 100 | 52 | 98 | 100 |
| 3 week @ 23° C. | 93 | 94 | 94 | 94 | 71 | 18 | 25 | 79 | 100 | 50 | 99 | 100 |
| 3 week @ 60° C. | 100 | 100 | 100 | 100 | 75 | 69 | 98 | 94 | 100 | 70 | 100 | 100 |
| Shore A Hardness (10 sec.), average of 5 readings | 4.8 | 3.2 | 5.1 | 3.3 | 23.7 | 26.9 | 16.2 | 8.7 | * | 30.0 | 9.5 | 3.1 |

*too soft to measure

Example 2 Results

OBC C11R07 with a lower octene concentration in the soft segment when compared to D9007 (about 13 mol % C11R07 vs 18 mol % D9007) has lower oil bleed than D9007. In contrast to D9007, oil bleed rates for C11R07 are similar at 23° C. and 60° C., possibly indicating an effect of the low melting soft segment crystallites arising from the lower octene concentration. While lower octene content in the soft segment improves oil bleed, it also raises hardness. Addition of p-silica to D9007 enables similar hardness to C11R07 but with improved oil bleed resistance. Alternatively, by increasing oil to p-silica ratio in D9007 the 23° C. oil bleed resistance is maintained while hardness is reduced compared to a compound based on C11R07.

Oil concentration in excess of the carrying capacity of the silica is prone to bleed-out. In D9007 with 150 phr oil, the 3 week 23° C. normalized oil bleed index (NOBI) is 18 for 64 phr p-silica compared to 79 for 43 phr p-silica, where 64 phr is the p-silica concentration in which 150 phr oil can be fully sorbed. D9007 and 150 phr oil without p-silica has a NOBI of 93 under the same conditions.

Example 3 p-Silica and Polyolefin

The properties of the materials used in Example 3 are provided below.

D9007—same as Example 1.

C11R07—same as Example 2.

C11R02 ethylene/octene copolymer (The Dow Chemical Company)—0.46 MI, 0.8535 g/cc density OBC, 131 ppm Zn, 20.8 mol % total octene, 70,030 $M_n$, 174,680 $M_w$, $M_w/M_n$=2.49.

Isotactic propylene homopolymer (iPP), PP 5E16S (The Dow Chemical Company), 35 MFR (2.16 kg/230° C.), 0.880-0.913 g/cc density.

Kraton G1651 (Kraton Corp.)—nominally 0.91 g/cc density, 33% styrene, 67% ethylene-butene linear block copolymer.

Hydrobrite 550 (Sonneborn)—same as Example 1.

Polydex HS(550)70 (Polychem Dispersions, Inc.)—70% Hydrobrite 550 oil on a precipitated silica carrier (HiSil ABS).

Atomite (Imerys)—Calcium carbonate, finely ground to 3 micron mean particle size.

HiSil ABS (PPG)—Carrier grade of precipitated silica. Spray-dried powder with no surface treatment (to maximize carrying capacity) and mildly reinforcing.

Sample Preparation

Compounds are prepared in a 190° C. Haake Rheomix 3000E mixer with roller style blades following the general procedure provided in Example 1. Preimbibing OBC pellets with oil minimized slippage and mixing time. Systems containing oil supported on silica were found to compound readily in the batch mixer without slippage.

Molded plaques are aged (24 hrs, 1 week and 3 weeks at 23° C. and 60° C.) while resting on sheets of ZigZag cigarette paper. After aging, the cigarette paper is removed and optically scanned against a black background to measure the extent of oil-bleed. The normalized oil-bleed index (NOBI) is calculated.

The hardness of each sample is measured. The results are shown in Tables 5A-5D below.

TABLES 5A-5D

| Ingredient | 5 | 6 | 7 | 8 | 9 | 10 | 11 | 15 | 12 | 13 | 14 | 16 | 17 | 18 | 20 | 24 |
|---|---|---|---|---|---|---|---|---|---|---|---|---|---|---|---|---|
| | | 60% oil D9007 | | | | 70% oil D9007 | | | | 70% oil C11R07 | | | extra silica & ultra-high oil gels | | | C8 = D9007 |
| | | | | | | | | | 5A phr | | | | | | | |
| D9007 | 100 | 100 | 100 | 100 | 100 | 100 | 100 | 100 | | | | | 100 | 100 | 100 | |
| C11R02 | | | | | | | | | | | | | | | | 47.8 |
| C11R07 | | | | | | | | | 100 | 100 | 100 | 100 | | | | 52.2 |
| iPP | | 50 | 50 | 50 | | 50 | 50 | 50 | | 50 | 50 | 50 | | | | 50 |
| Kraton G1651 | | | | | | | | | | | | | | | | |
| Hydrobrite 550 | | | | 150 | | | 233 | 83 | | | 233 | 83 | | | | 233 |
| Vaseline | | | | | | | | | | | | | | | | |
| CaCO₃ (Atomite) | | | 36 | 100 | | 100 | 100 | | | 100 | 100 | | | | | 100 |
| HiSil ABS | | | | | | | | | | | | | 50 | 85 | | |
| HS(Britol) 70 [70% oil/30% p-silica] | 214 | 214 | 214 | | 333 | 333 | | 214 | 333 | 333 | | 214 | 333 | 571 | 571 | |
| TOTAL | 314 | 364 | 400 | 400 | 433 | 483 | 483 | 547 | 433 | 483 | 483 | 547 | 483 | 756 | 671 | 483 |
| | | | | | | 5B Wt (% based on total Wt composition) | | | | | | | | | | |
| D9007 | 32 | 27 | 25 | 25 | 23 | 21 | 21 | 18 | | | | | 21 | 13 | 15 | |
| C11R02 | | | | | | | | | | | | | | | | 10 |
| C11R07 | | | | | | | | | 23 | 21 | 21 | 18 | | | | 11 |
| iPP | | 14 | 13 | 13 | | 10 | 10 | 9 | | 10 | 10 | 9 | | | | 10 |
| Kraton G1651 | | | | | | | | | | | | | | | | |
| Hydrobrite 550 | | | | 38 | | | 48 | 15 | | | 48 | 15 | | | | 48 |
| Vaseline | | | | | | | | | | | | | | | | |
| CaCO₃ (Atomite) | | | 9 | 25 | | 21 | 18 | | | 21 | 18 | | | | | 21 |
| HiSil ABS | | | | | | | | | | | | | 10 | 11 | | |
| HS(Britol) 70 [70% oil/30% p-silica] | 68 | 59 | 54 | | 77 | 69 | | 39 | 77 | 69 | | 39 | 69 | 76 | 85 | |
| TOTAL | 100% | 100% | 100% | 100% | 100% | 100% | 100% | 100% | 100% | 100% | 100% | 100% | 100% | 100% | 100% | 100% |
| | | | | | | 5C Wt (g) | | | | | | | | | | |
| D9007 | 60.5 | 52.2 | 47.5 | 47.5 | 43.9 | 39.3 | 39.3 | 34.7 | | | | | 39.3 | 25.1 | 28.3 | |
| C11R02 | | | | | | | | | | | | | | | | 18.8 |
| C11R07 | | | | | | | | | 43.9 | 39.3 | 39.3 | 34.7 | | | | 20.5 |
| iPP | | 26.1 | 23.8 | 23.8 | | 19.7 | 19.7 | 17.4 | | 19.7 | 19.7 | 17.4 | | | | 19.7 |
| Kraton G1651 | | | | | | | | | | | | | | | | |
| Hydrobrite 550 | | | | 71.3 | | | 91.7 | 28.8 | | | 91.7 | 28.8 | | | | 91.7 |
| Vaseline | | | | | | | | | | | | | | | | |
| CaCO₃ (Atomite) | | | 17.1 | 47.5 | | 39.3 | 34.7 | | | 39.3 | 34.7 | | | | | 39.3 |
| HiSil ABS | | | | | | | | | | | | | 19.7 | 21.4 | | |
| HS(Britol) 70 [70% oil/30% p-silica] | 129.5 | 111.7 | 101.7 | | 146.1 | 131.0 | | 74.3 | 146.1 | 131.0 | | 74.3 | 131.0 | 143.5 | 161.7 | |
| TOTAL | 190.0 | 190.0 | 190.0 | 190.0 | 190.0 | 190.0 | 190.0 | 190.0 | 190.0 | 190.0 | 190.0 | 190.0 | 190.0 | 190.0 | 190.0 | 190.0 |
| | | | | | | 5D Normalized Oil Bleed Index (NOBI) results | | | | | | | | | | |
| 24 hrs @ 23° C. | 2 | 1 | 3 | 10 | 3 | −2 | 46 | 2 | 12 | 0 | 22 | 2 | 4 | 9 | 4 | 37 |
| 24 hrs @ 60° C. | 12 | 1 | 8 | 11 | 8 | 1 | 94 | 15 | 7 | 6 | 27 | 10 | 2 | 17 | 26 | 77 |
| 1 week @ 23° C. | 13 | 12 | 8 | 14 | 9 | −1 | 61 | 12 | 9 | 5 | 39 | 17 | 6 | −2 | 17 | 80 |
| 1 week @ 60° C. | 26 | 12 | 9 | 37 | 13 | 17 | 100 | 34 | 7 | 14 | 46 | 18 | 3 | 13 | 61 | 95 |
| 3 week @ 23° C. | 11 | −1 | 9 | 16 | 11 | 7 | 73 | 24 | 31 | 11 | 100 | 50 | 6 | 6 | 50 | 93 |
| 3 week @ 60° C. | 35 | 13 | 12 | 55 | 64 | 33 | 100 | 81 | 42 | 42 | 79 | 69 | 15 | 30 | 85 | 97 |
| Shore A Hardness (10 sec.), average of 5 readings | 25.5 | 49.7 | 50.0 | 20.7 | 21.7 | 34.1 | 7.9 | 29.4 | 43.9 | 57.0 | 31.4 | 53.6 | 43.5* | * | | 6.3 |

*Compression molded plaque was highly fractured

Example 3 Results

Combinations of p-silica and polypropylene (PP), and excess p-silica are evaluated for their effects on oil bleed from olefin block copolymer (OBC) soft compounds. Evaluations are conducted at a laboratory batch mixer/compression molding scale. Combinations of p-silica and PP provide better oil resistance than p-silica or PP alone, with a 20 unit increase in normalized oil bleed index (NOBI) for the combination of 50 phr PP and 64 phr p-silica than for 64 phr p-silica alone in D9007 with 150 phr Hydrobrite 550 oil. The effectiveness of p-silica and PP combined allows 233 phr oil to be used in D9007 with NOBI<10 after 3 weeks at 23° C. and <35 at 60° C.

Compounds based on C11R07 (containing about 13 mol % octene in the soft segment and an 85/15 soft/hard segment split) have higher oil bleed resistance than those based on D9007 (18 mol % octene in soft segment with 89/11 soft/hard segment split) at 60° C. but also higher hardness. When blended with random copolymer C11R02 (similar to the soft segment composition of OBCs having 18-20 mol % octene) to equivalent crystallinity as D9007, hardness is equivalent and oil bleed is approximately equal (or slightly worse at 23° C.). In general, C11R07 has room temperature oil bleed almost as severe as 60° C. oil bleed in many cases, unlike D9007. When p-silica and PP are used as anti-bleed agents in a 233 phr oil formulation, D9007 compounds have lower hardness and equivalent oil bleed as C11R07 compounds.

Excess p-silica (beyond the amount needed for oil carrier) is found to lead to further reduction in oil bleed but also yields poor moldability, resulting in fractured compression molded plaques. Thus, the mixture of PP and p-silica offers a benefit over that which can be achieved by p-silica alone.

Example 4

Different Types of p-Silica

The properties of the materials used in Example 4 are provided below.

D9007—same as Example 1.

Hydrobrite 550 (Sonnebom)—same as Example 1.

Polydex HS(550)70 (Polychem Dispersions, Inc.)—70% Hydrobrite 550 oil on a precipitated silica carrier (Hi-Sil ABS).

Hi-Sil ABS (PPG)—Carrier grade of precipitated silica. Spray-dried powder with no surface treatment (to maximize carrying capacity) and mildly reinforcing. 35 micron median agglomerate size, 142 m$^2$/g surface area (BETS), 305 ml/100 g oil absorption, 8 lb/ft$^2$ bulk density, 4% moisture loss at 105° C. as shipped.

Sipernat 22 (Degussa Evonik)—Carrier grade of precipitated silica. Approximately 100 micron mean particle size, 110 micron d50, 190 m$^2$/g specific surface area (N$_2$), 260 g/100 g DBP absorption, approximately 65-67% carrying capacity, 6% loss on drying (2 hr@105° C.).

Sipernat 33 (Degussa Evonik)—Precipitated silica, 125 micron d50, 190 m$^2$/g specific surface area (N$_2$), 300 g/100 g DBP absorption, approximately 72% carrying capacity, 6% loss on drying (2 hr@105° C.).

Sipernat 2200 (Degussa Evonik)—Precipitated silica. 320 micron d50, 185 m$^2$/g specific surface area (N$_2$), 250 g/100 g DBP absorption, approximately 65-67% carrying capacity, 5% loss on drying (2 hr@105° C.).

Perkasil SM660 (Grace Davison)—precipitated silica, 16 micron mean particle size, 190 m$^2$/g specific surface area (BET), absorbs 240% oil (g/g), 2 cc/g pore volume.

DE MN2 (Eagle Picher)—diatomaceous earth. DE MN2 is a grade with approximately 180% oil absorption and sold as a dried, sized powder for catalyst support. It contains less than 0.1 wt % crystalline silica. No surface treatment.

Perlite CP1200 (Eagle Picher)—A fine (~30 micron) grade of expanded perlite that absorbs approximately 350% oil. Free of crystalline silica. No surface treatment.

TABLE 6

Summary of Precipitated Silica Properties

| Grade | Specific Surface Area (m$^2$/g) | Mean or Median Particle Size (micron) | Oil Absorption (g/100 g) [oil is DBP or other] |
|---|---|---|---|
| Perkasil SM660 | 190 | 16 | 240 |
| Sipernat 2200 | 185 | 320 | 250 |
| Sipernat 22 | 190 | 100 | 260 |
| Sipernat 33 | 190 | 125 | 300 |
| Hi-Sil ABS | 142 | 35 | 305 |

Sample Preparation

Compounds are prepared in a 190° C. Haake Rheomix 3000E mixer with roller style blades following the general procedure provided in Example 1. Preimbibing OBC pellets with oil minimized slippage and mixing time. Preimbibed pellets were mixed with the fillers in the Haake mixer.

TABLES 7A-7D

| | 30-1 | 30-2 | 30-3 | 30-4 | 30-5 | 30-6 Cntl | 30-7 DE | 30-8 Perlite | 5-15 Cntl2 |
|---|---|---|---|---|---|---|---|---|---|
| | Compare Silicas | | | | | | | | |
| | 7A phr | | | | | | | | |
| D9007 | 100 | 100 | 100 | 100 | 100 | 100 | 100 | 100 | 100 |
| Hydrobrite 550 | 150 | 150 | 150 | 150 | 150 | | 150 | 150 | 150 |
| Sipernat 22 (Degussa Evonik) | 64 | | | | | | | | |
| Sipernat 33 (Degussa Evonik) | | 64 | | | | | | | |
| Sipernat 2200 (Degussa Evonik) | | | 64 | | | | | | |
| HiSil ABS (PPG) | | | | 64 | | | | | |
| Perkasil SM660 (Grace Davison) | | | | | 64 | | | | |
| HS(Britol) 70 (70% H550 oil/30% p-silica ABS) | | | | | | 214 | | | |
| DE MN2 (Eagle Picher) | | | | | | | 64 | | |
| Perlite CP1200 (Eagle Picher) | | | | | | | | 64 | |
| TOTAL | 314 | 314 | 314 | 314 | 314 | 314 | 314 | 314 | 250 |

TABLES 7A-7D-continued

| | 30-1 | 30-2 | 30-3 | 30-4 | 30-5 | 30-6 Cntl | 30-7 DE | 30-8 Perlite | 5-15 Cntl2 |
|---|---|---|---|---|---|---|---|---|---|
| | | | Compare Silicas | | | | | | |
| 7B Wt (% based on total Wt composition) | | | | | | | | | |
| D9007 | 32 | 32 | 32 | 32 | 32 | 32 | 32 | 32 | 40 |
| Hydrobrite 550 | 48 | 48 | 48 | 48 | 48 | | 48 | 48 | 60 |
| Sipernat 22 (Degussa Evonik) | 20 | | | | | | | | |
| Sipernat 33 (Degussa Evonik) | | 20 | | | | | | | |
| Sipernat 2200 (Degussa Evonik) | | | 20 | | | | | | |
| HiSil ABS (PPG) | | | | 20 | | | | | |
| Perkasil SM660 (Grace Davison) | | | | | 20 | | | | |
| HS(Britol) 70 (70% H550 oil/30% p-silica ABS) | | | | | | 68 | | | |
| DE MN2 (Eagle Picher) | | | | | | | 20 | | |
| Perlite CP1200 (Eagle Picher) | | | | | | | | 20 | |
| TOTAL | 100% | 100% | 100% | 100% | 100% | 100% | 100% | 100% | 100% |
| 7C Wt (g) | | | | | | | | | |
| D9007 | 60.5 | 60.5 | 60.5 | 60.5 | 60.5 | 60.5 | 60.5 | 60.5 | 76.0 |
| Hydrobrite 550 | 90.8 | 90.8 | 90.8 | 90.8 | 90.8 | | 90.8 | 90.8 | 114.0 |
| Sipernat 22 (Degussa Evonik) | 38.7 | | | | | | | | |
| Sipernat 33 (Degussa Evonik) | | 38.7 | | | | | | | |
| Sipernat 2200 (Degussa Evonik) | | | 38.7 | | | | | | |
| HiSil ABS (PPG) | | | | 38.7 | | | | | |
| Perkasil SM660 (Grace Davison) | | | | | 38.7 | | | | |
| HS(Britol) 70 (70% H550 oil/30% p-silica ABS) | | | | | | 129.5 | | | |
| DE MN2 (Eagle Picher) | | | | | | | 38.7 | | |
| Perlite CP1200 (Eagle Picher) | | | | | | | | 38.7 | |
| TOTAL | 190 | 190 | 190 | 190 | 190 | 190 | 190 | 190 | 190 |
| 7D Normalized Oil Bleed Index (NOBI) results | | | | | | | | | |
| 24 hrs @ 23° C. | −1 | 8 | 13 | 19 | 2 | −1 | 10 | 7 | 56 |
| 24 hrs @ 60° C. | 6 | 19 | 20 | 24 | 21 | 1 | 26 | 59 | 96 |
| 1 week @ 23° C. | 9 | 34 | 23 | 6 | 6 | 11 | 46 | 53 | 80 |
| 1 week @ 60° C. | 12 | 85 | 86 | 41 | 37 | 41 | 100 | 99 | 99 |
| 3 week @ 23° C. | 6 | 17 | 11 | 2 | −5 | 14 | 72 | 71 | 95 |
| 3 week @ 60° C. | 19 | 35 | 76 | 37 | 49 | 42 | 99 | 100 | 100 |
| Shore A Hardness (10 sec.), average of 5 readings | 24.7 | 23.4 | 26.6 | 21.9 | 23.4 | 26.6 | 15.3 | 15.7 | |

Example 4 Results

All tested precipitated silica grades are effective in significantly reducing oil bleed but the best performance overall is by Sipernat 22 (Degussa Evonik), followed closely by Hi-Sil ABS and Perkasil SM660.

Diatomaceous earth and perlite provide a small degree of oil bleed inhibition but are much less effective than precipitated silicas. Bounded by no particular theory, it is believed that higher structure (more reinforcing) fillers have more capacity for oil sorption within a compound or more interfacial surface and thus may impart greater resistance to oil bleed. Perlite has very high oil absorptive capacity yet is not as effective as p-silica.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. An oil-extended olefin block copolymer composition comprising:
   from 30 wt % to 40 wt % of an ethylene/α-olefin multi-block copolymer consisting of ethylene monomer and a straight-chain or branched, non-conjugated α-olefin comonomer with 3 to 30 carbon atoms;
   from 45 wt % to 55 wt % of an oil; and
   from 10 wt % to 30 wt % of a sole filler that is a synthetic precipitated silica and the composition has a normalized oil-bleed index of less than 20 after 1 week at 23° C., and a Shore A hardness from about 5 to about 50.

2. The composition of claim 1 wherein the olefin block copolymer has a density from about 0.85 g/cc to about 0.88 g/cc.

3. The composition of claim 1 comprising an oil/precipitated silica pre-mix.

4. The composition of claim 3 wherein the pre-mix comprises from about 60 wt % to about 80 wt % oil and from about 40 wt % to about 20 wt % precipitated silica.

5. The composition of claim 1 having a normalized oil-bleed index (NOBI) of less than 30 after 3 weeks at 23° C.

6. An oil-extended olefin block copolymer composition comprising:
   from 10 wt % to 40 wt % of an ethylene/α-olefin multi-block copolymer consisting of ethylene monomer and a straight-chain or branched, non-conjugated α-olefin comonomer with 3 to 30 carbon atoms;
   from 5 wt % to 20 wt % of a propylene-based polymer;
   from 20 wt % to 60 wt % of an oil; and
   5 wt % to 25 wt % of a sole filler that is a synthetic precipitated silica; and
   the composition has a normalized oil-bleed index of less than 20 after 1 week at 23° C., and a Shore A hardness from 5 to 50.

7. The composition of claim 6 wherein the propylene-based polymer is a propylene homopolymer.

8. The composition of claim 1 wherein the synthetic precipitated silica is exclusive of silica gel, quartz silica, and fumed silica.

9. The composition of claim 6 wherein the synthetic precipitated silica is exclusive of silica gel, quartz silica, and fumed silica.

10. The composition of claim 6 having a normalized oil-bleed index of less than 30 after 3 weeks at 23° C.

* * * * *